(12) United States Patent
Barrett et al.

(10) Patent No.: US 9,454,298 B2
(45) Date of Patent: Sep. 27, 2016

(54) METHODS AND APPARATUS RELATED TO EXPANDING OR CONTRACTING REPRESENTATIONS OF DATA

(71) Applicant: Brigham Young University, Provo, UT (US)

(72) Inventors: William Arthur Barrett, Provo, UT (US); Ryan Thomas Cheatham, Loveland, CO (US)

(73) Assignee: Brigham Young University, Provo, UT (US)

( * ) Notice: Subject to any disclaimer, the term of this patent is extended or adjusted under 35 U.S.C. 154(b) by 177 days.

(21) Appl. No.: 14/046,602

(22) Filed: Oct. 4, 2013

(65) Prior Publication Data

US 2014/0101602 A1    Apr. 10, 2014

Related U.S. Application Data

(60) Provisional application No. 61/709,823, filed on Oct. 4, 2012.

(51) Int. Cl.
*G06F 3/0485* (2013.01)

(52) U.S. Cl.
CPC ... *G06F 3/0485* (2013.01); *G06F 2203/04806* (2013.01)

(58) Field of Classification Search
CPC .......................... G06F 3/0485; G06F 3/04845
USPC ........................................ 715/753, 784, 783
See application file for complete search history.

(56) References Cited

U.S. PATENT DOCUMENTS

| | | | |
|---|---|---|---|
| 5,812,135 A | 9/1998 | Kotchey | |
| 5,943,679 A | 8/1999 | Niles et al. | |
| 6,252,597 B1 | 6/2001 | Lokuge | |
| 6,396,941 B1 | 5/2002 | Bacus et al. | |
| 7,647,563 B2 | 1/2010 | Guido et al. | |
| 7,788,599 B2 | 8/2010 | Michaud et al. | |
| 8,185,557 B2 | 5/2012 | Slinker | |
| 2003/0007002 A1* | 1/2003 | Hida et al. | 345/734 |
| 2004/0165010 A1* | 8/2004 | Robertson | G06F 3/0481 715/805 |
| 2004/0169688 A1 | 9/2004 | Burdick et al. | |
| 2015/0278273 A1 | 10/2015 | Wigington et al. | |

FOREIGN PATENT DOCUMENTS

JP    2012-084058 A    4/2012

OTHER PUBLICATIONS

U. Dogrusoz et al., "A multi-graph approach to complexity management in interactive graph visualization", Computer & Graphics 30, 2006, pp. 86-97 (12 pages).
Sarkar et al., "Graphical Fisheye Views of Graphs", CHI '92, Association for Computing Machinery, May 3-7, 1992, pp. 83-91 (9 pages).

* cited by examiner

*Primary Examiner* — Matt Kim
*Assistant Examiner* — David Luu
(74) *Attorney, Agent, or Firm* — Brake Hughes Bellermann LLP

(57) ABSTRACT

In one general aspect, a non-transitory computer-readable storage medium can be configured to store instructions that when executed cause a processor to perform a process. The process can include receiving an indicator configured to trigger movement of a representation of a first portion of data and a representation of a second portion of data in a direction toward a boundary where the boundary is oriented with respect to a display area. The process can also include modifying a position of the representation of the first portion of data with respect to a position of the representation of second portion of data in response to the indicator.

20 Claims, 13 Drawing Sheets

METHODS AND APPARATUS RELATED TO EXPANDING OR CONTRACTING REPRESENTATIONS OF DATA

CROSS REFERENCE TO RELATED APPLICATION

This application is a Non-provisional of, and claims priority to, U.S. Provisional Application No. 61/709,823, filed on Oct. 4, 2012, entitled "Methods and Apparatus Related to Expanding or Contracting Representations of Data", which is incorporated by reference herein in its entirety.

TECHNICAL FIELD

This description relates to expanding or contracting representations of data.

BACKGROUND

A user interface can be used to view data in a variety of ways. However, known user interfaces used for viewing data can be insufficient to view data and the relationships between elements of the data without losing context. For example, although known user interfaces can be used to view portions of hierarchical data using various functions such as zoom in, zoom out, etc., a user viewing the hierarchical data through these known user interfaces can lose the context of the data because of the size and complexity of the hierarchical data. Thus, a need exists for systems, methods, and apparatus to address the shortfalls of present technology, and to provide other new and innovative features.

SUMMARY

In one general aspect, a non-transitory computer-readable storage medium can be configured to store instructions that when executed cause a processor to perform a process. The process can include receiving an indicator configured to trigger movement of a representation of a first portion of data and a representation of a second portion of data in a direction toward a boundary where the boundary is oriented with respect to a display area. The process can also include modifying a position of the representation of the first portion of data with respect to a position of the representation of second portion of data in response to the indicator. In some embodiments, the representation of the first portion of data and the representation of the second portion of data have a hierarchical relationship with a third portion of data having a representation within the display area and the modified position of the representation of the first portion of data represents an increase in distance from the position of the representation of the second portion of data. In such embodiments the process may further include modifying a position of a representation of a fourth portion of data with respect to a position of a representation of a fifth portion of data, the fourth portion of data and the fifth portion of data having a hierarchical relationship with a sixth portion of data, the modified position of the representation of the fourth portion of data representing a decrease in distance, based on the representation of the fourth portion of data approaching an edge boundary, from the position of the representation of the fifth portion of data, the fourth portion of data and the first portion of data having a same hierarchical level.

In another general aspect, a non-transitory computer-readable storage medium can be configured to store instructions that when executed cause a processor to perform a process. The process can include receiving an indicator of panning a display area in a first direction with respect to a portion of a representation of a plurality of data objects. The process can also include triggering expansion, in a second direction, of a spatial relationship between at least a representation of a first object from the plurality of objects and a representation of a second object from the plurality of objects in response to the indicator of the panning. In some embodiments, the process can include triggering contraction in the second direction, of a spatial relationship between at least a representation of a third object from the plurality of objects and a representation of a fourth object when the third object is at a target distance from an edge boundary of the display area.

The details of one or more implementations are set forth in the accompanying drawings and the description below. Other features will be apparent from the description and drawings, and from the claims.

DETAILED DESCRIPTION

Figure 1:
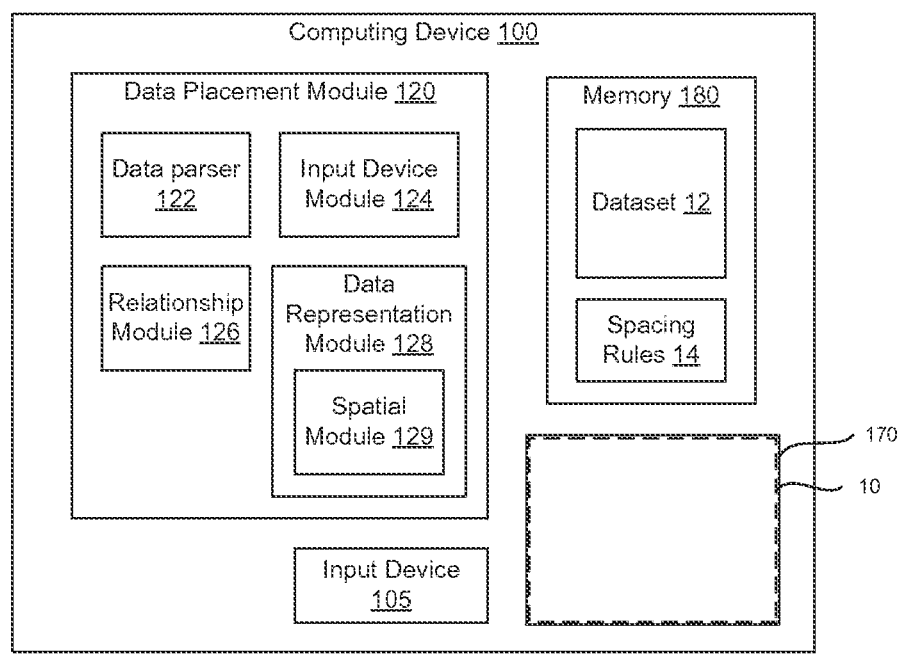
FIG. 1 is a diagram that illustrates a data placement module included in a computing device.

FIG. 1 is a diagram that illustrates a data placement module 120 included in a computing device 100. The data placement module 120 is configured to modify one or more spatial relationships between one or more representations of portions of a dataset 12 displayed within a display area 10 of a display 170 in response to movement of the representations of the portions of the dataset 12 based on one or more spacing rules 14 stored in a memory 180. In other words, the data placement module 120 can be configured to modify the positions of one or more representations of portions of the dataset 12 displayed within the display area 10 of the display 170 in response to movement of the representations of the portions of the dataset 12 based on one or more of the spacing rules 14. Although discussed in terms of movement of the representations of the portions of the dataset 12 within the display area 10 (which is considered a static area), in some embodiments, the movement can be described in terms of movement of the display area 10 with respect to the representations of the portions of the dataset 12 (which can be considered a static object).

The representations of the portions of the dataset 12 can include graphical representations of individual portions of the dataset 12 (e.g., data elements, data objects) and relationships between portions of the dataset 12. For example, the dataset 12 can include hierarchical data that is represented by rectangular shapes including alphanumeric characters where the rectangular shapes are linked together by lines. The movement of the representations of the portions of the dataset 12, which can include moving the representations of the portions of the dataset 12 in any combination of directions, including horizontal, vertical, diagonal, panning, etc., can be triggered via an input device 105 of the computing device 100. In some embodiments, the portions of the dataset 12 that can be represented can be referred to as data elements, data portions, or as data objects.

For example, representations of portions of the dataset 12 can be selected for display in the display area 10 of the display 170 by the data placement module 120 at a first time. Movement of the representations of the portions of the dataset 12, such as panning of the representations of the portions of the dataset 12 in a horizontal direction, can be triggered by a user via the input device 105 of the computing device 100 at a second time. The movement of the representations of the portions of the dataset 12 can be received by the data placement module 120, and the data placement module 120 can be configured to modify, at a third time, one or more spatial relationships between the representations of the portions of the dataset 12 displayed within the display area 10 of the display 170 in response to the movement triggered via the input device 105 based on one or more of the spacing rules 14.

One or more spatial relationships between representations of portions of the dataset 12 as displayed within the display area 10 of the display 170 can be modified by the data placement module 120 so that the context of the data can be perceived by a user viewing the data in a more desirable fashion. The context can be maintained even though only portions of the dataset 12 may be viewed within the display area 10 of the display 170. The relationships between various portions of representations of the dataset 12 can be more easily processed by a user without losing context when the spatial relationships between the data is modified in response to movement of the representations of the portions of the dataset 12. For example, if the dataset 12 is hierarchical dataset, certain portions of hierarchical dataset can be expanded in a vertical direction with movement of the representations of the data in a horizontal direction so that the hierarchical data can be viewed without losing the context of the relationships between different levels of the hierarchical dataset even though only a portion of the hierarchical data is being viewed. The size and complexity of the hierarchical dataset may be viewing the entirety of the dataset within the display area 10. More specific examples related to these concepts are described below.

In some embodiments, the input device 105 can include various types of input devices such as, for example, a keyboard, one or more buttons, an electrostatic touchpad to control a mouse cursor, a mouse device, etc. The input device 105 can be used by a user to move (e.g., pan, scroll, grab, push) representations of the portions of the dataset 12. Although shown as being included in the computing device 100, the input device 105 can be separate component from the computing device 100.

In some embodiments, the dataset 12 can be included in a table, stored in a spreadsheet, stored in a relational database, and/or so forth. The dataset 12 can include relationships (or representations thereof) between data portions (e.g., data elements) included in the dataset 12. In some embodiments, the dataset 12 can include information (e.g., metadata, characteristics) that can be used by the data representation module 128 to form a representation of the dataset 12 in the display area 10 of the display 170.

As shown in FIG. 1, the data placement module 120 includes a data parser 122. The data parser 122 is configured to receive (e.g., retrieve) one or more portions of the dataset 12, and is configured to parse the data into portions that can be included in representations of the dataset 12 for display within the display area 10 of the display 170. In some embodiments, the parsing of the dataset 12 can be based on one or more parsing rules (not shown).

The data placement module 120 also includes a relationship module 126 configured to identify (e.g., retrieve) relationships between portions of the dataset 12 that have been parsed by the data parser 122. In some embodiments, identifying of relationships by the relationship module 126 can include defining relationships between portions of the dataset 12 that have been parsed by the data parser 122.

The data placement module 120 includes a data representation module 128. The data representation module 128 is configured to define a representation (e.g., a virtual representation) of the data for display in the display area 10 of the display 170 based on the data parsed by the data parser 122 and relationships identified by the relationship module 126.

As shown in FIG. 1, the data placement module 120 includes an input device module 124. The input device module 124 is configured to receive (e.g., retrieve) one or more indicators (e.g., signals) from the input device 105 that can be interpreted as triggering movement of a representation of the dataset 12 defined by, for example, the data representation module 128. In some embodiments, the display area 10 can be a different shape than that shown in FIG. 1, and/or can be included in only a portion of the display 170. Although shown as being included in the computing device 100, the display 170 can be separate component from the computing device 100.

The data placement module 120 includes a spatial module 129. The spatial module 129 is configured to define the spacing (e.g., spatial relationship, distance) between representations of one or more portions of the dataset 12 when the data representation module 128 is defining representations of the dataset 12. The spacing between representations of one or more portions of the dataset 12 can be defined and/or modified by the spatial module 129 based on the spacing rules 14 stored in the memory 180. Accordingly, the spatial module 129 can be configured to access the spacing rules 14. For example, the spatial module 129 can define the distance (e.g., a magnitude of the distance) between a representation of a first portion of the dataset 12 and a second portion of the dataset 12. In response to an indicator (e.g., signal) from the input device 105, the spatial module 129 can be configured to modify the distance (e.g., a magnitude of the distance) between the representation of the first portion of the dataset 12 and the second portion of the dataset 12.

In some embodiments, the spacing rules 14 can include mathematical relationships (e.g., formulas, equations), boundaries, (e.g., viewing boundaries, threshold boundaries), conditions, and/or so forth. For example, the spatial module 129 can be configured to define or modify a spatial relationship between representations of portions of the dataset 12 based on a mathematical relationship. As another example, the spatial module 129 can be configured to define or modify a spatial relationship between representations of portions of the dataset 12 based on the representations of the portions of the dataset 12 having a specific orientation with respect to a boundary. In some embodiments, the spatial module 129 can be configured to define or modify a spatial relationship between representations of portions of the dataset 12 based on the representations of the portions of the dataset 12 being included within a boundary or crossing a boundary. In some embodiments, the spatial module 129 can be configured to define or modify a spatial relationship between representations of portions of the dataset 12 based on one or more conditions included in one or more of the spacing rules 14 being satisfied or unsatisfied. In some embodiments, the spatial module 129 can be configured to define or modify a spatial relationship between representations of portions of the dataset 12 based on a scaling factor. A specific example of a representation of a dataset that can be processed by the data placement module 120 is shown in FIG. 2.

Figure 2:
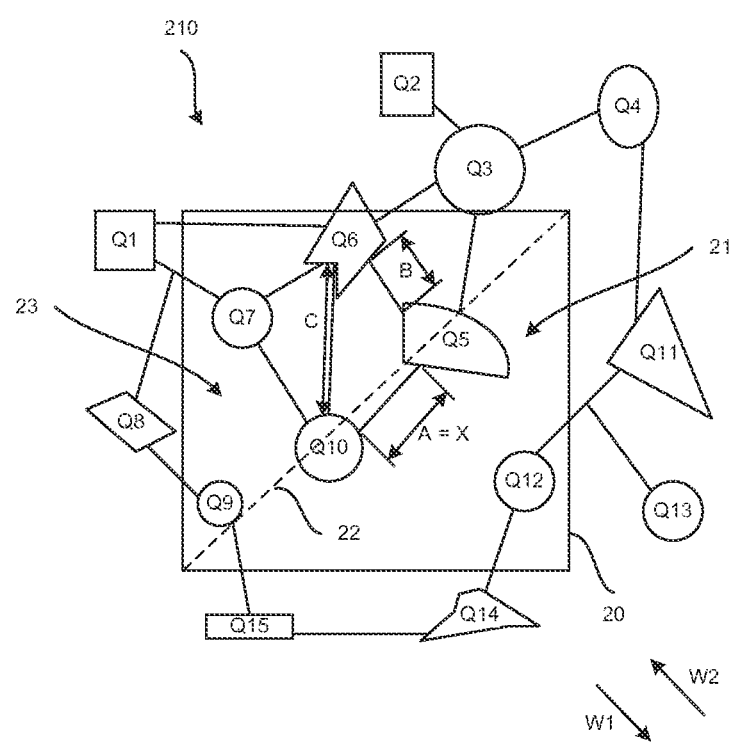
FIG. 2 is a diagram that illustrates a representation of a dataset having a portion displayed within a display area.

FIG. 2 is a diagram that illustrates a representation of a dataset 210 having a portion displayed within a display area 20. The representation of the dataset 210 includes representations of data portions Q1 through Q15. In some embodiments, each of the data portions Q1 through Q15 can be referred to as data elements. Various relationships between the data portions Q1 through Q15 are represented by lines. For example, data portion Q4 is related to data portion Q3 and data portion Q11 as represented by a line between data portion Q4 and data portion Q3 and as represented by a line between data portion Q4 and data portion Q11. In some embodiments, representations of data portions can be referred to as data portions. For example, a representation of data portion Q7 (when displayed in the display area 20) can be referred to as data portion Q7 without the word representation. Although discussed in terms of movement of the representations of the dataset 210 within the display area 20, in some embodiments, the movement can be described in terms of movement of the display area 20 with respect to the representations of the dataset 210.

In this embodiment, distances (e.g., spatial relationships) between related pairs of data portions from the data portions Q1 through Q15 are defined and/or modified based on an orientation with respect to the boundary 22 (which can be defined within one or more spacing rules (e.g., spacing rules 14 shown in FIG. 1)). The boundary 22 is defined so that any pair of related data portions Q1 through Q15 that have at least a portion that cross boundary 22 when moved along direction W1 are separated by at least a magnitude X. In other words, pairs of related data portions Q1 through Q15 that have at least a portion disposed within region 21 of the display area 20 are separated by at least a magnitude X, and pairs of related data portions Q1 through Q15 that have at least a portion disposed within region 23 of the display area 20 are allowed to be separated by a distance that can be greater than, equal to, or less than magnitude X. The spatial relationships (e.g., positions) between the related pairs of data portions Q1 through Q15 can be defined by, for example, the data placement module 120 shown in FIG. 1.

As a specific example, as shown in FIG. 2, a distance A between related data portion Q5 and Q10 is equal to magnitude X because the data portion Q5 and the data portion Q10 each have at least a portion that is moved across the boundary 22 along direction W1. If the data portion Q5 and/or the data portion Q10 is moved across the boundary along direction W2 (which is in a direction opposite direction W1), the distance A between the data portion Q5 and the data portion Q10 can be decreased, for example contracted, decreased to a default distance, decreased based on a mathematical relationship. These increases and/or decreases in distance can be implemented by the spatial module 129 included in the data placement module 120 shown in FIG. 1 based on the spacing rules 14.

In some embodiments, the magnitude X can be referred to as a target distance or can be a minimal distance. Accordingly, the boundary 22 can be defined so that any pair of related data portions Q1 through Q15 that have at least a portion that cross boundary 22 when moved along direction W1 can be separated by a target distance or a minimal distance. In some embodiments, the boundary 22 can be defined so that any pair of related data portions Q1 through Q15 that have at least a portion that cross boundary 22 when moved along direction W1 are separated by a maximum distance. In some embodiments, the boundary 22 can be defined so that any pair of related data portions Q1 through Q15 that have at least a portion that cross boundary 22 when moved along direction W1 can overlap by a target distance. These increases and/or decreases in distance can be implemented by the spatial module 129 included in the placement module 120 shown in FIG. 1 based on the spacing rules 14.

As shown in FIG. 2, a distance B between related data portion Q5 and data portion Q6 is less than magnitude X. In response to the data portions Q5, Q6 being moved across the boundary 22 along direction W1 into region 21 of the display area 20, the distance B between data portion Q5 and data portion Q6 can be increased or expanded to magnitude X. In other words, in response to the data portions Q5, Q6 being moved across the boundary 22 along direction W1 into region 21 of the display area 20, the distance B between a position of data portion Q5 and a position of data portion Q6 can be increased or expanded to magnitude X. These increases and/or decreases in distance can be implemented by the spatial module 129 included in the placement module 120 shown in FIG. 1 based on the spacing rules 14.

In some embodiments, the distance between pairs of related data portions, can be increased or decreased in a continuous (e.g., a smooth fashion, a dynamic fashion) until a boundary is crossed. In some implementations the spatial module 129 included in the placement module 120 shown in FIG. 1 may increase or decrease the distance. For example, in this embodiment, the distance B between related data portion Q5 and data portion Q6 is less than magnitude X. As the data portions Q5, Q6 are being moved toward the boundary 22 along direction W1, the distance B between data portion Q5 and data portion Q6 can be increased. The distance B between the data portion Q5 and data portion Q6 can be continually increased (in response to movement along direction W1) until at least a portion of data portion Q5 and data portion Q6 are moved into region 21 of the display area 20 and the distance B between data portion Q5 and data portion Q6 is increased to magnitude X. In some embodiments, the distance B between the data portion Q5 and data portion Q6 can continue to be increased beyond magnitude X as the data portion Q5 and data portion Q6 continue to be moved along direction W1.

In some embodiments, the distance (e.g., spatial relationship) between related pairs of data portions can be based on one or more mathematical relationships. The mathematical relationships can be one or more of the spacing rules 14. Accordingly, the distance between related pairs of data portions can continuously and smoothly be modified. For example, related pairs of data portions Q6, Q7 can be separated by a first distance, based on a mathematical relationship, when one or more of the data portions Q6, Q7 are a second distance from the boundary 22, for example while in region 23. The data portions Q6, Q7 can be separated by a magnitude X, based on the mathematical relationship, when both of the data portions Q6, Q7 are at the boundary 22. The data portions Q6, Q7 can be separated by a third distance, based on the mathematical relationship, when one or more of the data portions Q6, Q7 are at a fourth distance from the boundary 22, for example while in region 21.

Because each of the data portions Q1 through Q15 can have more than one relationship, more than one spatial relationship between data portions Q1 through Q15 can be affected. As the spatial relationship between a targeted relationship is modified, for example by the spatial module 129 included in the placement module 120 shown in FIG. 1, the spatial relationship between a relationship that is not targeted can be collaterally modified. For example, as the distance A (which is the relationship targeted for modification) between related data portion Q5 and data portion Q10 is modified with movement with respect to boundary 22, distance C between data portion Q6 and data portion Q10 can be modified (e.g., modified collaterally). The change in the distance C between data portion Q6 and data portion Q10 can occur as a result of the change in the distance A. In some embodiments, the modification of the distance C can be referred to as a collateral spatial modification.

This example is described in terms of direction W1 and direction W2 for simplicity. In some embodiments, the data portions Q1 through Q15 can be moved across the boundary 22 in a variety of directions that can be linear and/or nonlinear. In other words, the panning of the data portions Q1 through Q15 can be performed in a variety of directions.

In this embodiment, the boundary 22 is represented by a line. Although not shown, in some embodiments, the boundary 22 can be a nonlinear boundary. For example the boundary 22 may have one or more curved portions, may be a stepwise boundary, etc. Although not shown, in some embodiments, the boundary 22 may not extend across the entire display area 20. In some embodiments, a boundary can define a boundary area (e.g., a region). Accordingly, in such embodiments, pairs of related objects that move into or out of the boundary area can have a spatial relationship that is modified. In some embodiments, a boundary, or a portion thereof, can be disposed outside of the display area 20.

In some embodiments, modification (e.g., an increase, a decrease) of a spatial relationship between data portions can be based on a particular portion of a representation of the data portions. For example, an increase in a spatial relationship between a representation of a first portion of data and a representation of a second portion of data can be based on a point in the representation of the first portion of data and/or a point in the representation of the second portion of data crossing a boundary or coming within a threshold distance of a boundary. As another example, an increase in a spatial relationship between a representation of a first portion of data and a representation of a second portion of data can be based on an edge in the representation of the first portion of data and/or an edge in the representation of the second portion of data crossing a boundary or coming within a threshold distance of a boundary.

In some embodiments, the spatial module 129 included in the placement module 120 shown in FIG. 1 may define and/or modify distances (e.g., spatial relationships) between several pairs of data portions from the data portions Q1 through Q15 based on an orientation with respect to the boundary 22. For example, as the distance A between the data portion Q5 and the data portion Q10 is modified with respect to the boundary 22, the distance B between the data portion Q5 and the data portion Q6 can be modified, for example modified in a proportional fashion and/or modified based on a mathematical relationship. The distance B between the data portion Q5 and the data portion Q6 can be modified based on a link between the relationship connecting the data portion Q5 and the data portion Q6 and the relationship connecting the data portion Q5 and the data portion Q10. As another example, as the distance A between the data portion Q5 and the data portion Q10 is modified with respect to the boundary 22, the distance between the data portion Q1 and the data portion Q7 can be modified (e.g., modified in a proportional fashion, modified based on a mathematical relationship). The distance between the data portion Q1 and the data portion Q7 can be modified based on a link between the relationship between the data portion Q1 and the data portion Q7 and the relationship between the data portion Q5 and the data portion Q10. The link between the relationship between the data portion Q1 and the data portion Q7 and the relationship between the data portion Q5 and the data portion Q10 can be defined with a dataset, for example dataset 12 shown in FIG. 1, and/or within spacing rules, for example spacing rules 14 shown in FIG. 1.

Although the data portions Q1 through Q15 are represented as being related by lines, in some embodiments, data portions may not be related by lines that are visibly displayed to a user in the display area 20. In other words, relationships between the data portions Q1 through Q15 may not be visible or may be invisible. Although the data portions Q1 through Q15 are represented as having shapes, in some embodiments, data portions may not be bounded, or represented, by lines shapes that are visibly displayed to a user in the display area 20.

In some embodiments, the representations of one or more the data portions Q1 through Q15 can be modified (by the spatial module 129 included in the placement module 120 shown in FIG. 1) with respect to a boundary, e.g., boundary 22 or another boundary (not shown). For example, the size of data portion Q9 can be increased or decreased as the data portion Q9 crosses the boundary 22, or another boundary (not shown).

As shown in FIG. 2, the representation of the dataset 210 is a two-dimensional representation. The two-dimensional representation can be produced by the data representation module 128 shown in FIG. 1. In some embodiments, the principles described herein can be related to datasets represented in more than two dimensions (e.g., 3 dimensions, 4 dimensions). For example, a three dimensional representations of a dataset can have a boundary defined by a plane, a curved two-dimensional shape, and/or so forth rather than a line or one-dimensional boundary. In such embodiments, movement of a representation of a dataset having more than two-dimensions (or of a display area), with respect to a boundary having more than one-dimension, can be in more than two dimensions.

In some embodiments, the data portions Q1 through Q15 can represent different types of data parsed by the data parser 122 of the data placement module 120 shown in FIG. 1. In some embodiments, each of the data portions Q1 through Q15 data can include data represented alphanumerically, data represented in shapes, data represented in colors, and/or so forth.

Although not shown in FIG. 2, in some embodiments, the spatial relationship between related data portions from the data portions Q1 through Q15 can be modified (e.g., increased, decreased) (by the spatial module 129 included in the placement module 120 shown in FIG. 1) in response to more than one boundary (which can be defined with the spacing rules 14 shown in FIG. 1). For example, the distance A can be configured to increase in response to boundary 22, and can be configured to further increase, or decrease, in response to another boundary (not shown).

Referring back to FIG. 1, in some implementations, the computing device 100 can be, for example, a wired device and/or a wireless device (e.g., Wi-Fi enabled device) and can be, for example, a computing entity (e.g., a personal computing device), a server device (e.g., a web server), a mobile phone, a touchscreen device, a personal digital assistant (PDA), a laptop, a television including, or associated with, one or more processors, a tablet device, an e-reader, and/or so forth. The computing device 100 can be configured to operate based on one or more platforms (e.g., one or more similar or different platforms) that can include one or more types of hardware, software, firmware, operating systems, runtime libraries, and/or so forth.

The components (e.g., modules, processors) of the computing device 100 can be configured to operate based on one or more platforms (e.g., one or more similar or different platforms) that can include one or more types of hardware, software, firmware, operating systems, runtime libraries, and/or so forth. In some implementations, the components of the computing device 100 can be configured to operate within a cluster of devices (e.g., a server farm). In such an implementation, the functionality and processing of the components of the computing device 100 can be distributed to several devices of the cluster of devices.

The components of the computing device 100 (e.g., the data placement module 120 of the computing device 100) can be, or can include, any type of hardware and/or software configured to process attributes. For example, in some implementations, one or more portions of the components shown in the components of the data placement module 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computing device 100 can be, or can include, a software module configured for execution by at least one processor (not shown). In some implementations, the functionality of the components can be included in different modules and/or different components than those shown in FIG. 1.

In some embodiments, one or more of the components of the computing device 100 can be, or can include, processors configured to process instructions stored in a memory (e.g., the memory 180). For example, the data placement module 120 (and/or a portion thereof) can be, or can include, a combination of a processor and a memory configured to execute instructions related to a process to implement one or more functions.

Although not shown, in some implementations, the components of the computing device 100, such as the data placement module 120 of the computing vice 100, can be configured to operate within, for example, a data center, a cloud computing environment, a computer system, one or more server/host devices, and/or so forth. In some implementations, the components of the computing device 100 can be configured to operate within a network. Thus, the components of the computing device 100 can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the memory 180 can be any type of memory such as a random-access memory, a disk drive memory, flash memory, and/or so forth. In some implementations, the memory 180 can be implemented as more than one memory component (e.g., more than one RAM component or disk drive memory) associated with the components of the computing device 100. In some embodiments, the memory 180 (or a portion thereof) can be a remote database, a local database, a distributed database, a relational database, a hierarchical database, and/or so forth. As shown in FIG. 1, at least some portions of the dataset 12 can be stored in the memory 180 (e.g., local memory, remote memory) of the computing device 100. In some embodiments, the memory 180 can be, or can include, a memory shared by multiple devices such as computing device 100. In some implementations, the memory 180 can be associated with a server device (not shown) within a network and configured to serve the components of the computing device 100.

FIGS. 3A through 3D are diagrams that illustrate a representation of a hierarchical dataset 310 having a portion displayed within a display area 30. The hierarchical dataset 310 includes several columns of data including columns of data A through E. The column of data A is hierarchically related to the column of data B, and so forth. In some embodiments, the columns of data can be referred to as levels (e.g., hierarchical levels) of data. In this embodiment, directions Y1 and Y2 are referred to as vertical directions, directions X1 and X2 are referred to as horizontal directions. Although discussed in terms of movement of the representations of the hierarchical dataset 310 within the display area 30, in some embodiments, the movement can be described in terms of movement of the display area 30 with respect to the representations of the hierarchical dataset 310.

As illustrated in FIGS. 3A through 3D, the distance between data portions of the representation of the hierarchical dataset 310 is increased (by the spatial module 129 included in the placement module 120 shown in FIG. 1) along directions Y1 and Y2 as the representation of the hierarchical dataset 310 is moved along direction X1 (which is orthogonal to directions Y1 and Y2). The representation of hierarchical dataset 310 may be moved in response to indicators (e.g., signals) received at the input device module 124 via the input device 105). In other words, the representation of the hierarchical dataset 310 is expanded along directions Y1 and Y2 as the representation of the hierarchical dataset 310 is moved along direction X1. Said differently, the positions of the representations of the portions of data included in the hierarchical dataset 310 is expanded along directions Y1 and Y2 as the representation of the hierarchical dataset 310 is moved along direction X1. In this embodiment, the increase in distance is triggered based on boundary 32 which is included in the display area 30. Although not shown, in FIGS. 3A through 3D, the distance between data portions of the representation of the hierarchical dataset 310 is decreased along directions Y1 and Y2 as the representation of the hierarchical dataset 310 is moved along direction X2 (which can be referred to as a horizontal direction and which is orthogonal to directions Y1 and Y2). Accordingly, the spatial relationships (in a vertical direction) between data portions included in the representation of the hierarchical dataset 310 can be based on a horizontal orientation of the representation of the hierarchical dataset 310 with respect to the boundary 32.

In this embodiment, movement of the representation of the hierarchical dataset 310 along direction X1 with respect to the boundary 32 can be referred to as the expanding or increasing direction. Movement of the representation of the hierarchical dataset 310 along direction X2 with respect to the boundary 32 can be referred to as the contracting or decreasing direction.

In this embodiment, the distance between data portions of the representation of the hierarchical dataset 310 is increased (by the spatial module 129 included in the placement module 120 shown in FIG. 1) along directions Y1 and Y2, which is parallel to the boundary 32. Although not shown, in some embodiments, the distance between data portions of the representation of the hierarchical dataset 310 can increase along directions Y1 and Y2 nonparallel to the boundary 32. In such embodiments, spacing rules (e.g., spacing rules 14) associated with the boundary 32 can be defined to implement these variations.

Figure 3A:
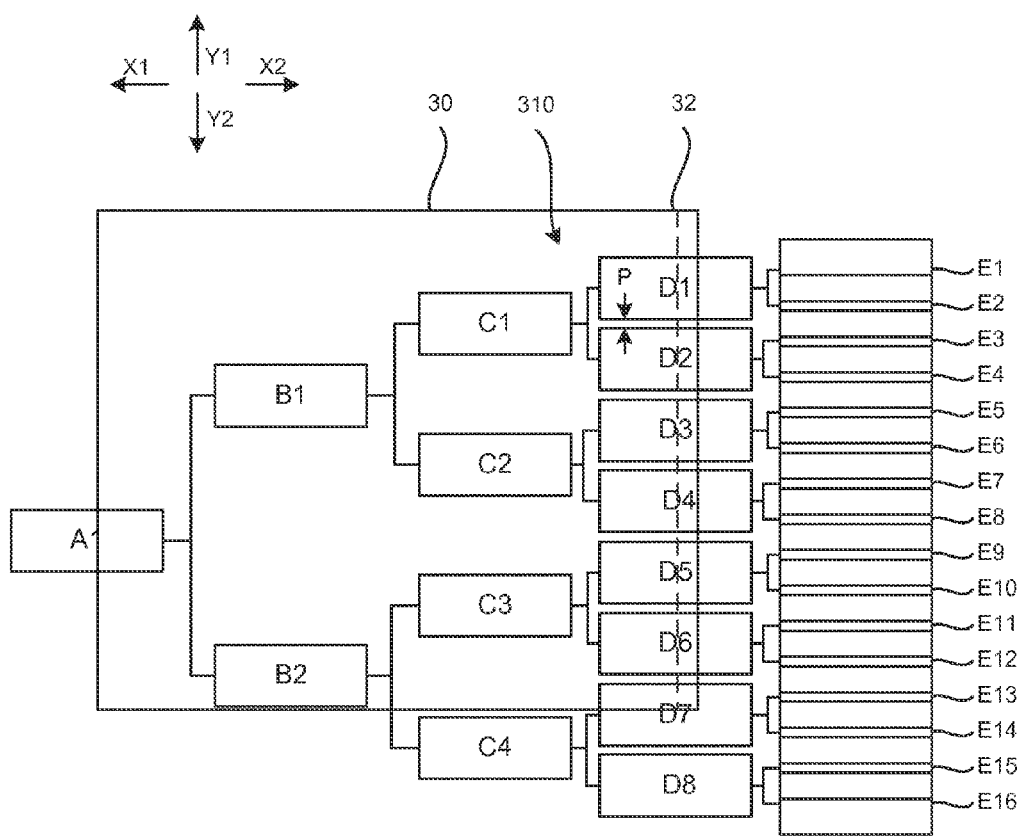
FIGS. 3A through 3D are diagrams that illustrate a representation of a hierarchical dataset having a portion displayed within a display area.
Figure 3B:
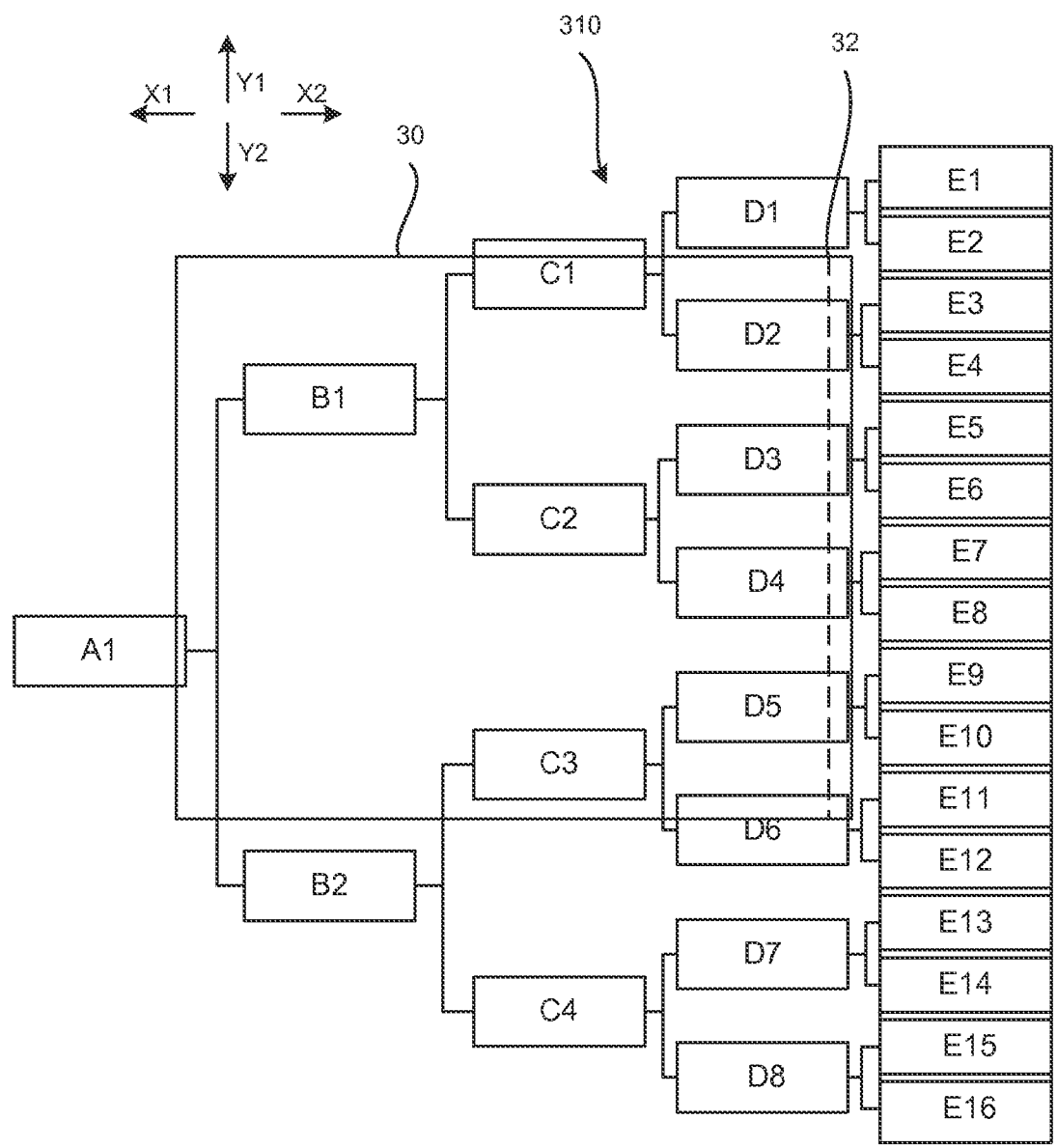
Figure 3C:
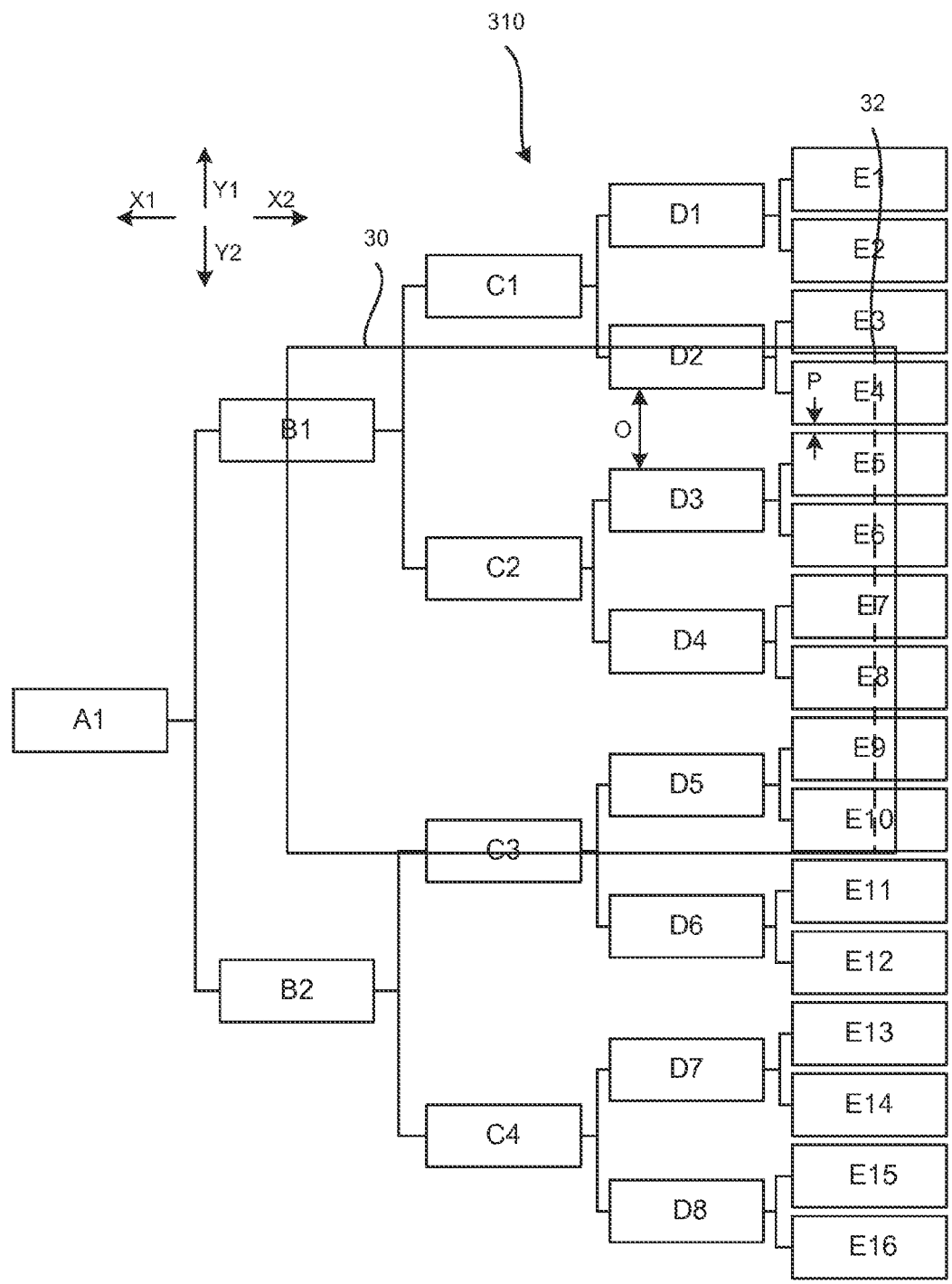

In this embodiment, the distance between the data portions D1 through D8 (e.g., representations of the data portions D1 through D8) included in the column of data D is increased to a distance having at least a magnitude P (also can be referred to as a minimum magnitude or distance or a target magnitude or distance) when a middle portion of the column of data D is at the boundary 32. As shown in FIG. 3B, as the column of data is moved through the boundary along direction X1, the distance between the data portions D1 through D8 increases until the distance between the data portions E1 through E16 (e.g., representations of the data portions E1 through E16) included in the column of data E is increased to at least a magnitude P as shown in FIG. 3C. The distance between the data portions E1 through E16 included in the column of data E is increased to at least the magnitude P when a middle portion of the column of data E is at the boundary 32. In this embodiment, the distance between the data portions E1 through E16 is at the magnitude P, the data portions D1 through D8 are separated by a distance having a magnitude O.

As shown in FIG. 3C, the distances between the representations of the data portions E1 through E16 are increased until the representations of the data portions E1 through E16 are no longer overlapping (e.g., are separated). As shown in FIGS. 3A and 3C, the representations of the data portions E1 through E16 are overlapping (e.g., are disposed on one another). For example, data portion E1 is disposed over at least a portion of data portion E2.

In this embodiment, the expansion or contraction (by the spatial module 129 included in the placement module 120 shown in FIG. 1) of the hierarchical dataset 310 is caused by (e.g., driven by) the column of data closest to the boundary 32 and moving toward the boundary 32. In this embodiment, expansion or contraction of the hierarchical dataset 310 is caused by (e.g., driven by) a target portion of the hierarchical dataset 310 (e.g., a single column of data). For example, the distance between the data portions A1, B1 through B2, and C1 through C4 is caused by increasing distance between the data portions D1 through D8 (which is the target column of data) until the distance between the data portions D1 through D8 is at the magnitude P. After the distance between the data portions D1 through D8 is at the magnitude P, the distance between the data portions A1, B1 through B2, C1 through C4, and D1 through D8 is caused by increasing distance between the data portions E1 through E16 (which are on the left side of the boundary 32 and is the target column of data) until the distance between the data portions E1 through D16 is at the magnitude P.

Accordingly, in this embodiment, as the hierarchical dataset 310 is moved along direction X1, the expansion of the hierarchical dataset 310 on either side of a column of data approaching (or disposed within) the boundary 32 is caused by the increase in the distance of the column of data approaching (or disposed within) the boundary 32. Similarly, as the hierarchical dataset 310 is moved along direction X2, the contraction of the hierarchical dataset 310 on either side of a column of data approaching (or disposed within) the boundary 32 is caused by the decrease in the distance of the column of data approaching (or disposed within) the boundary 32. These increases and/or decreases can be implemented by the spatial module 129 included in the placement module 120 shown in FIG. 1.

In this embodiment, the data portions associated with the hierarchical dataset 310 are linked via relationships, for example relationships defined within the dataset 12 shown in FIG. 1. In some embodiments, different data portions of the columns of data of the hierarchy are centered with respect to one another. For example, the data portion B1 included in column of data B is centered vertically (along directions Y1, Y2) between data portions C1 and C2 included in a column of data C, and the data portion B2 included in column of data B is centered vertically (along directions Y1, Y2) between data portions C3 and C4 included in a column of data C. Accordingly, as the column of data C expands (e.g., expands vertically), the column of data B expands (e.g., expands vertically) in a collateral fashion.

In some embodiments, the data portions of hierarchically related columns may not be centered with respect to one another. For example, the data portion B1 included in column of data B may not be centered vertically (along directions Y1, Y2) between data portions C1 and C2 included in a column of data C. In such embodiments, as the column of data C expands (e.g., expands vertically), the column of data B may or may not expand (e.g., expands vertically) in a collateral fashion.

In this embodiment, the hierarchical levels of data are aligned in a horizontal direction. For example, each of the data portions E1 through E16 is aligned so that they form a single, aligned column. In some embodiments, the hierarchical columns or levels of data may not be aligned in a horizontal direction. For example, data portion E1 can be horizontally offset from data portion E2 so that these data portions do not form a single, aligned column of data.

Because the expansion or contraction of the hierarchical dataset 310 is caused by the orientation of the hierarchical dataset 310 with respect to the boundary line 32 (along a horizontal direction), the expansion or contraction of the hierarchical dataset 310 can be caused by movement of the hierarchical dataset 310 along a variety of directions. For example, the hierarchical dataset 310 can be moved along some combination of direction X1 and Y1, or direction X1 and Y2, to trigger expansion of the hierarchical dataset 310. Similarly, the hierarchical dataset 310 can be moved along some combination of direction X2 and Y2, or direction X2 and Y1, to trigger contraction of the hierarchical dataset 310.

Figure 3D:
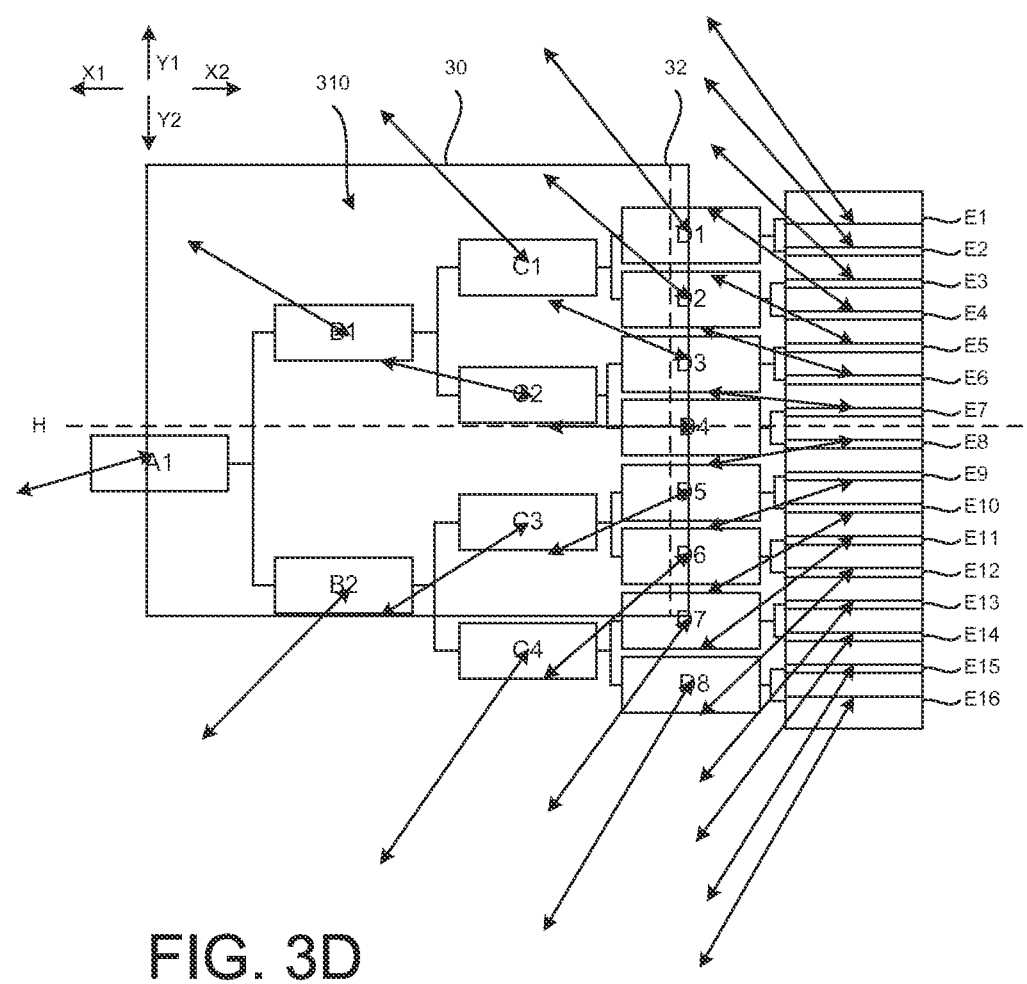

FIG. 3D is a diagram that illustrates the expansion or contraction (by the spatial module 129 included in the placement module 120 shown in FIG. 1) of the hierarchical dataset 310 within FIGS. 3A through 3C. The movements of the individual data portions are represented by arrows. As illustrated by FIG. 3D, the distance between pairs of related data portions, can be increased or decreased in a continuous, smooth fashion, and/or dynamic fashion. In the example of FIG. 3D, the expansion or contraction of the hierarchical dataset 310 is performed in a relatively linear fashion. In other words, each of the data portions move in a linear fashion during expansion or contraction of hierarchical dataset 310. In some embodiments, the movement of the individual data portions can be performed in a nonlinear fashion. In some embodiments, the movement of the individual data portions can be represented by one or more mathematical relationships.

In some embodiments, the hierarchical dataset 310 can represent at least a portion of a genealogical dataset. For example, the data portion A1 can represent a child of parents represented by the data portions B1 and B2. The data portions C1 through C4 can represent the grandparents of the child represented by data portions A1, and so forth.

As shown in FIGS. 3A through 3D, the hierarchical dataset 310 has hierarchical levels that change in a horizontal direction. Accordingly, the boundary 32 is a vertical boundary that is orthogonal to the direction of the hierarchical dataset. In some embodiments, the principles described herein can be associated with hierarchical datasets that have hierarchical levels changing in a vertical direction, a diagonal direction, and/or so forth. For example, the hierarchical dataset can be an organizational chart with hierarchical levels that are aligned along the vertical direction. In such embodiments, the boundaries may be horizontal boundaries. In other words, in some embodiments, the boundary may be orthogonal to the direction of the hierarchical dataset.

Although not shown in FIG. 3A through 3D, in some embodiments, the representations of one or more the data portions included in the hierarchical dataset 310 can be modified with respect to a boundary, e.g., boundary 32 or another boundary (not shown). For example, the size of data portion E1 can be increased or decreased as the data portion E1 crosses the boundary 32 or another boundary (not shown).

As shown in the example of FIG. 3D, the expansion and contraction of the hierarchical dataset 310 are centered about a horizontal line H, which aligns with the direction of the hierarchical dataset 310. In some embodiments, this can be referred to as the origin of modification, the origin of expansion, and/or the origin of contraction. In some embodiments, the origin of modification can be a point, can be a curved line, can be a plane (if in more than two dimensions). In some embodiments, the origin of modification can change depending on the location of the hierarchical dataset 310 with respect to the display area 30. In some embodiments, the origin of modification can be fixed with respect to the display area 30 or can be fixed with respect to one or more of the objects included in the hierarchical dataset 310.

The following is an example of a mathematical relationship that can be included in the spacing rules 14 and applied by the spatial module 129 shown in FIG. 1. Specially, in response to movement of the hierarchical dataset 310 along an arbitrary vector AB, a new vertical component ($DY_{new}$) of the vector AB can be calculated and used to move a target portion of the hierarchical dataset 310 based on the following formula:

$$DY_{new}=DY_{original}+(V_{offset} \cdot 2^{(-DXoriginal/W)} - V_{offset}),$$

where $DX_{original}$ is the horizontal component of the vector AB, $DY_{original}$ is the vertical component of the vector AB, W is the distance between levels (or columns of data) within the hierarchical dataset 310, and $V_{offset}$ is the offset of the target portion from the origin of modification before vector AB is applied. After $DY_{new}$ has been calculated, the target portion can be moved by the vector $AB_{new}$, which includes the new vertical component $DY_{new}$. In some embodiments, the vertical offset ($V_{offset}$) can be calculated from a center point or another point of the target portion of the hierarchical dataset 310. The formula above can be applied to one or more of the objects included in the hierarchical dataset 310. In some embodiments, the formula above can be modified with scalar factors, variables, etc.

Figure 4:
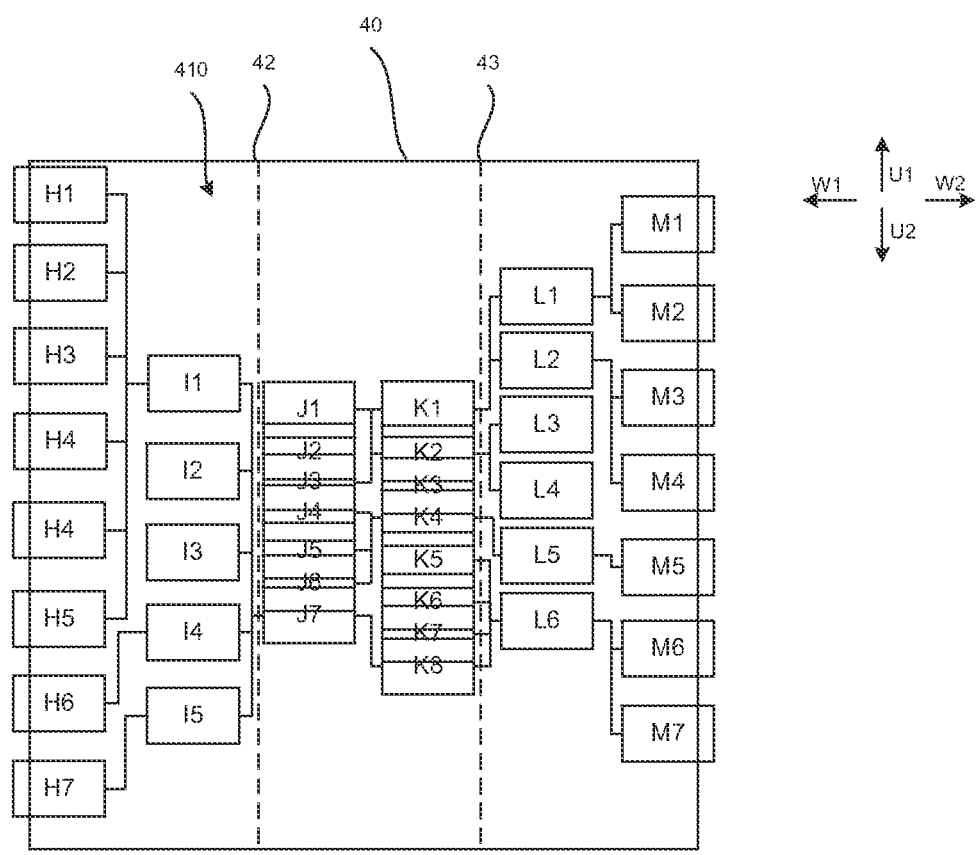
FIG. 4 is a diagram that illustrates a representation of a dataset having a portion displayed within a display area.

FIG. 4 is a diagram that illustrates a representation of a dataset 410 having a portion displayed within a display area 40. The dataset 410 includes several columns of data including columns of data H through M. In some embodiments, the dataset 410 can be hierarchical dataset 410. In some embodiments, the columns of data can be referred to as levels (e.g., hierarchical levels) of data. As shown in FIG. 4, portions of the representation of the dataset 410 are configured to expand or contract based on boundaries 42 and 43 (i.e., multiple boundaries). Specifically, in this embodiment, columns of data between boundaries 42 and 43 are configured to be contracted (e.g., in a contracted state) while columns of data are expanded (e.g., in an expanded state) to the right of boundary 43 and to the left of boundary 42.

In this embodiment, as the representation of the dataset 410 is moved along direction W1, the data associated with boundary 42 can expand (e.g., expand vertically) and the data associated with boundary 43 can (e.g., contract vertically). For example, the column of data J (which is approaching boundary 42) can expand as the representation of the dataset 410 is moved along direction W1, and the column of data L (which is approaching boundary 43) can contract as the representation of the dataset 410 is moved along direction W1. In a similar fashion, as the representation of the dataset 410 is moved along direction W2, the data associated with boundary 42 can contract (e.g., contract vertically) and the data associated with boundary 43 can expand (e.g., expand vertically). For example, the column of data I (which is approaching boundary 42) can contract as the representation of the dataset 410 is moved along direction W2, and the column of data K (which is approaching boundary 43) can contract as the representation of the dataset 410 is moved along direction W2.

FIGS. 5A through 5D are diagrams that illustrate a representation of a hierarchical dataset 510 having a portion displayed within a display area 50. The hierarchical dataset 510 includes several columns of data including columns of data H through K. The column of data H is hierarchically related to the column of data I, and so forth. In some embodiments, the columns of data can be referred to as hierarchical levels, or just levels, of data. Although discussed below in terms of movement of the representations of the hierarchical dataset 510 within the display area 50, in some embodiments, the movement can be described in terms of movement of the display area 50 with respect to the representations of the hierarchical dataset 510.

As illustrated in FIGS. 5A through 5D, the spatial module 129 included in the placement module 120 shown in FIG. 1 may modify the distance between data portions of the representation of the hierarchical dataset 510 along directions M1 and M2 as the representation of the hierarchical dataset 510 is moved. The spatial module 129 may modify the distance between data portions according to a number of factors, including proximity to edge boundaries and an expansion boundary. Edge boundaries may be boundaries parallel to a direction of the hierarchical dataset 510 that are on opposite sides of display 50. An expansion boundary may be orthogonal to the direction of the hierarchical dataset 510 and may represent a region of the display 50 where representations begin to be spaced further apart as they move over the boundary in an expansion direction. Of course, the expansion boundary may also be referred to as a contraction boundary in embodiments that cause representations to contract after crossing the boundary.

Figure 5A:
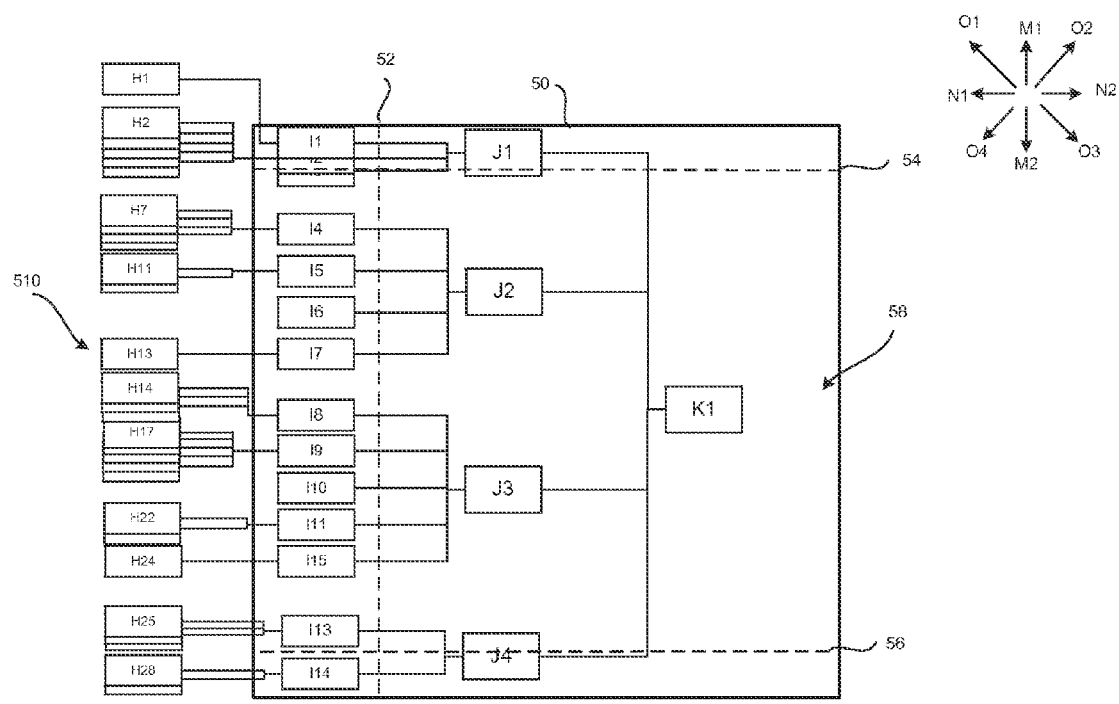
FIGS. 5A through 5D are diagrams that illustrate a representation of a hierarchical dataset having a portion displayed within a display area.

For instance, the spatial module 129 may decrease the distance between related data portions that approach an upper edge boundary 54 or a lower edge boundary 56 of display 50. Related data portions share the same parent in the hierarchical dataset 510. For example, I3 through I3 of FIG. 5A are related data portions because they share the data portion J1 as a parent. Related data portions, i.e., data portions that share a parent, may also be referred to as a group or a stack. In addition, the spatial module 129 may increase the distance between representations of data portions as the representations approach expansion boundary 52. In the example of FIG. 5A, the direction of the hierarchical dataset 510 is horizontal, so boundary 52 can be considered an expansion boundary. The distance between related data elements in the hierarchical level nearest the expansion boundary 52 may be based on the number of related data elements in the group of related elements, the proximity of the group to an edge border, and the number of child data elements, if representations of the children appear display 50. For example, although data elements J1 and J4 are near the upper boundary 54 and lower boundary respectively, the children of data element J1, namely I1 through I3, are spaced closer together than the children of data element J4, namely I13 and I14. As another example, the children of data element J3, namely I8 through I15, approach neither the upper edge boundary 54 nor the lower edge boundary 56, but the quantity of the children of J3 causes the distance between the related data elements (I8 to I15) to be smaller than the distance of the two children of J4. The distance between related data elements I8 to I15 may also be smaller than the distance between related elements I4 to I7.

The representation of hierarchical dataset 510 may be moved in response to indicators or signals received at the input device module 124 via the input device 105. In response to such indicators, the spatial module 129 may modify the positions of the representations of the hierarchical dataset 510. The movement can be a movement in any direction. The system may expand portions of the representations of the hierarchical dataset 510 along directions M1 and M2 as the representations of the hierarchical dataset 510 are moved along direction N2, but may contract representations that approach an edge boundary. Said differently, the positions of the representations of the portions of data included in the hierarchical dataset 510 may be expanded along directions M1 and M2 as the representation of the hierarchical dataset 510 is moved along direction N2 but do not approach an edge boundary. In this embodiment, the increase in distance is triggered based on expansion boundary 52 which is included in the display area 50. As a particular representation, or related representations approach an edge boundary the distance between the related representations may be decreased. The decrease in spacing may cause the representations to overlap. For example, the system may overlap the representations of items I1 through I3 of FIG. 5A. In some implementations, the spacing of the representations enables a user viewing display 50 to determine which representations have children as well as the number of children. For representations that overlap, e.g., due to proximity to an edge boundary, the number of related data elements at a particular level, and/or representations that have not crossed the expansion boundary, no additional details may be apparent in display 50. But for non-overlapping representations additional details may be included in the representations.

Figure 5B:
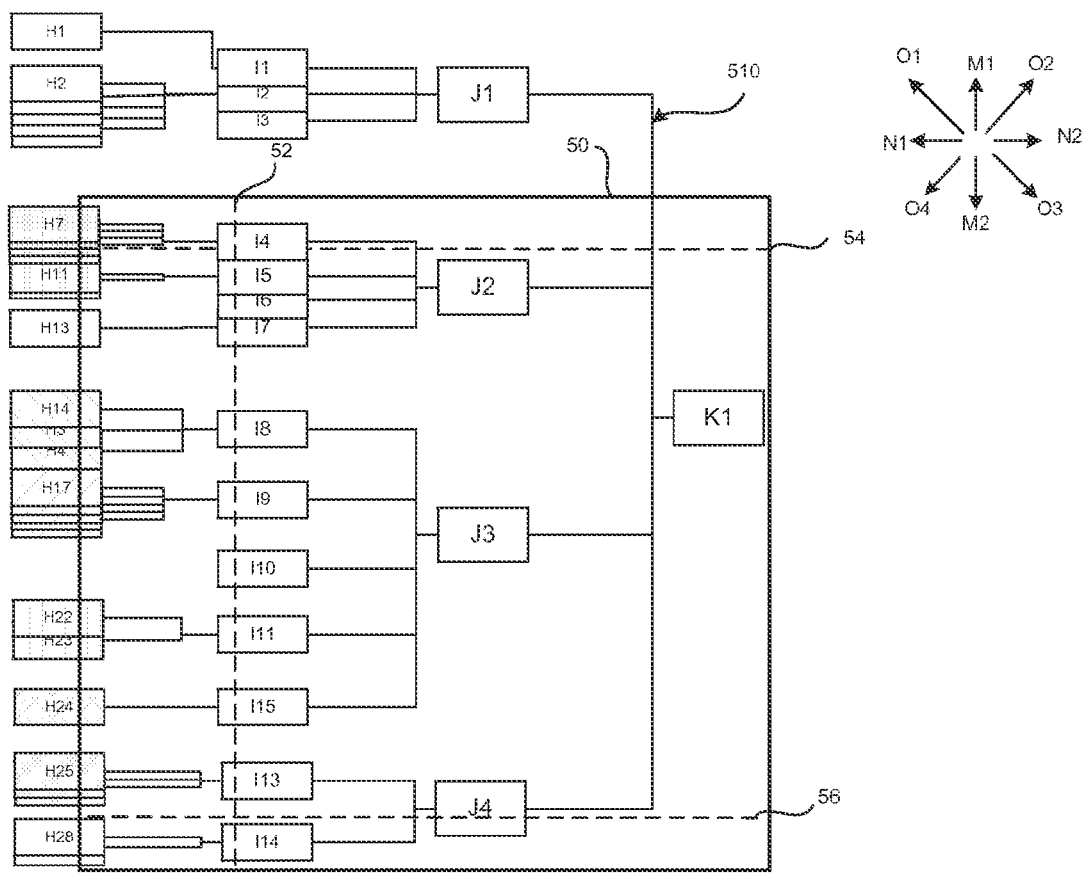

Although not shown, in FIGS. 5A through 5D, the distance between representations of data portions of the hierarchical dataset 510 can also decrease along directions M1 and M2 as the representation of the hierarchical dataset 510 is moved along direction N1 (which can be referred to as a horizontal direction and which is orthogonal to directions M1 and M2). In some embodiments, the distance may be decreased until a portion of the representation reaches the expansion boundary 52, at which point a further decrease in spacing may not occur unless the movement also brings a representation (or a related representation) to an edge boundary. In the example of FIGS. 5A through 5D, movement of the representation of the hierarchical dataset 510 along direction N2 with respect to the boundary 52 can be referred to as the expanding or increasing direction. Movement of the representation of the hierarchical dataset 510 along direction N1 with respect to the boundary 52 can be referred to as the contracting or decreasing direction. Thus, as shown in FIG. 5A, as the hierarchical dataset 510 is moved in the direction of N2, the distance between the representations in the same hierarchical level increases. The increase in distance may cause one or more of the representations in the hierarchical level to move off the display 50. In the example of FIG. 5B, the representation of data element J1 has expanded off the display 50. As a result, the hierarchical levels that are children of J1 may also be off display 50, e.g. children I1 through I3 and grandchildren H1 through H6.

A movement in direction N2 may cause data elements in another hierarchical level to appear in display 50. In the example of FIG. 5B, a movement in the direction of O2 translate into a combination of movement in the N2 direction and the M1 direction. As illustrated, a movement may be in a diagonal direction having any slope (e.g., not just the slope of O2), the slope having an N direction component and an M direction component. Due to movement in the N2 direction in the example of FIG. 5B, data portions H7 to H29 in column H now appear on display 50. When a lower hierarchical level appears in the display, the system may account for the number of related data portions in the lower level in determining the spacing of the data elements in the parent level. Thus, for example, although data element I4 has reached (or crossed over) the upper edge boundary 54 and data element I14 has reached (or crossed over) the lower edge boundary 56, the spacing rules may cause data elements I4 to I7 to be spaced closer together than data elements I13 and I14. This may occur because of the number of child data elements H7 to H13 for I4 to I7 is greater than the number of child data elements H25 to H29 for I13 and I14. Thus, in some implementations, the distance between data elements at a particular hierarchical level may be based on the number (or quantity) of related data elements from hierarchical dataset 510 at the next lower level that are also visible on display 50.

Because the distance between data elements may be relatively small, in some implementations, the system may modify the appearance of the representations, for example varying the color, the fill pattern, text color, etc., of representations. Related data elements, e.g., data elements that share the same parent in the hierarchical data set 510, may take on the same appearance. Thus, for example, data elements H7 to H10 may have a different appearance than data elements H11 and H12. The varying appearance of related representations may further help the user determine which data elements are related to a parent when data elements in the same column, or hierarchical level, overlap.

Figure 5C:
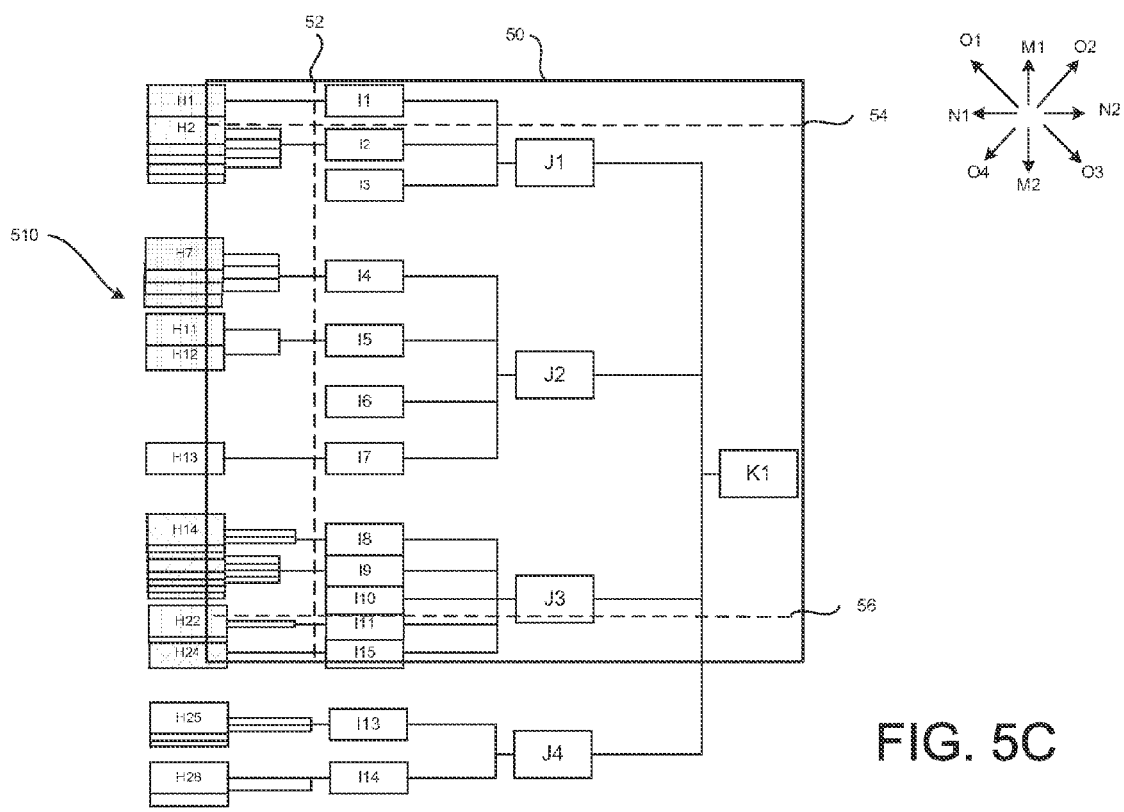

Movement of the representations of the hierarchical dataset 510 is not limited to directions N1 and N2. For example, a movement in the direction of M2 may result in the display illustrated by FIG. 5C. Movement in the direction of M2 causes data element J3 and its children to move from the center of display 50 toward the lower edge boundary 56. In response, the system, for example the spacing rules 14 as interpreted by the spatial module 129, may collapse the representations of the children of data element J3, namely data elements I8 to I15. Collaterally, the system may further collapse the children of I8 to I15 (the grandchildren of J3), namely H14 to H24. As illustrated, although data elements I8 to I15 are beyond the boundary 52, because they are related data elements and at least one related element has reached the lower edge boundary 56, the system may decrease the distance between the related representations. In other words, the system may begin to collapse the representations of the related data elements. Further, as illustrated in FIG. 5C, data element J2 has moved to the center of the display, away from upper edge boundary 54. Thus, the spacing rules as interpreted by the spatial module may increase the distance of data elements I4 through I7. Collaterally, the system may increase the spacing of data elements H7 to H13, which are children of data elements I4 to I7 and grandchildren to J2. In some embodiments, the system may keep child data elements centered with respect to their parent. Thus, unrelated data elements in the same level may be unevenly spaced. For example, data element H13 is spaced much further from H12 than data element H11 is from H10. Furthermore, because data element I4 has twice as many children as data element I5, the children of I4, namely H7 to H10, are spaced closer than the children of I5, namely H11 to H12. Thus, in some implementations, the spacing rules and/or the spatial module may base the distance between representations on the number of data elements with a common parent.

Figure 5D:
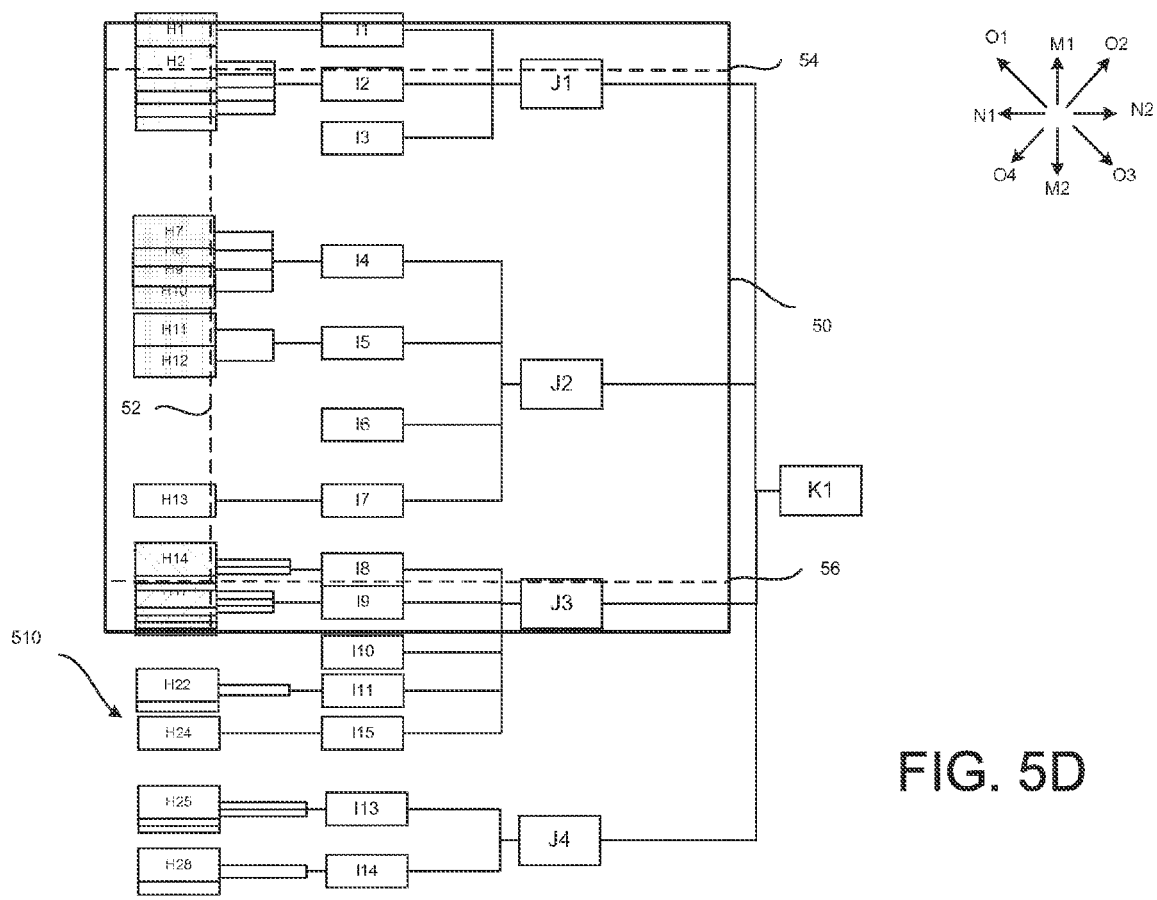

The user may provide an indication to the input device module 124 via the input device 105 that causes movement of the hierarchical dataset 510 illustrated in FIG. 5C further in the N2 direction. Such a movement may result in the display of FIG. 5D from FIG. 5C. As shown in FIG. 5D, the data element K1 moves off display 50 and a distance between the representations of data elements J1 through J3 increases. This may be the result of the grandchildren of J2, namely H7 through H13 reaching the expansion boundary 52. In addition, the distance between the children of J2, namely I4 to I7, may also increase.

In some implementations, the display 50 may keep a representation of a data element in a higher hierarchical level visible as long as a related data element at a lower level is visible in display 50 until the data element moves beyond an edge of the display opposite the expansion boundary. For example, in FIG. 5D the data element K1 has moved beyond the edge of display 50 opposite the expansion boundary 52, and therefore is no longer displayed. But data element J3 has not reached this edge of display 50 and may still have children with representations on display 50. Therefore, the system may keep the representation of data element J3 in display 50. This may result in unequal distances between related data elements at the same level. For example, the representation of data element J3 in FIG. 5D is closer to the representation of data element J2 than J2 is to the representation of data element J1. The spacing rules 14 and/or the spatial module 129 may adjust the distance between representations of related data elements at the same level based on the visibility of representations of children of those representations. In other words, movement of the representations of the hierarchical dataset 510 in a direction orthogonal to the hierarchical direction, in the example of FIGS. 5A to 5D directions M1 and M2, may result in uneven spacing of representations of the same level.

As shown in FIGS. 5A through 5D, the expansion or contraction via the spatial module 129 of related data elements of the hierarchical dataset 510 may be caused or driven by the column of data closest to the expansion boundary 52. The contraction of related data elements of the hierarchical dataset 501 may also be caused or driven by proximity to an edge boundary of any related data elements. For example, expansion or contraction of portions of the hierarchical dataset 510 is caused or driven by a target level of the hierarchical dataset 510 that is closest to the expansion boundary 52. For example, the distance between the data portions J1 through J3 and I4 through I7 in FIG. 5D is caused by increasing distance between the data portions H7 through H13 (which is the target column of data). Further, in some embodiments, the distance between related data portions, e.g. data portions in a group having the same parent, may be contracted when a data element in the group reaches an edge boundary. Thus, although data elements H1 through H6 have reached the expansion boundary 52, because at least one member of the group, namely H1 and H2, have also reached the edge boundary 54, the distance between members of this particular related group is not expanded. The amount of distance between members of the same related group may be dependent on the number of members of the group. The number of members in the group may also collaterally affect the spacing of the members of the common parent's related group. Thus, the spacing of I1 through I3, I4 to I7, and I8 through I15 may depend on the number of children in the next lower hierarchical level that are included in the display 50. In some implementations the representations of data portions in a group or stack may be collapsed and overlapping so that the representations take up no more room on the display than two un-collapsed representations displayed next to each other.

In some embodiments, the hierarchical dataset 510 can represent at least a portion of a genealogical dataset. For example, the data portion K1 can represent a parent of children represented by the data portions J1 through J4. The data portions I8 through I15 can represent the children of the parent represented by data portion J3, and so forth. In some implementations, the user may switch between a descendency view, represented by FIGS. 5A through 5D, and an ancestry view, represented by FIGS. 3A through 3D. For example, a user may provide an indication to the input device module 124 via the input device 105 that indicates the user desires to switch to an ancestry view using data element I5. Thus, data element I5 may become data element A1 of FIG. 3A. Likewise, the user may provide an indication that the user desires to switch to a descendency view using data element C2. Thus, data element C2 may become data element K1 of FIG. 5A.

Although not shown in FIGS. 5A through 5D, in some embodiments, the representations of one or more the data portions included in the hierarchical dataset 510 can be modified with respect to a boundary, e.g., boundary 52, boundary 54, boundary 56, or another boundary (not shown). For example, the size of data portion J3 of FIG. 5C can be decreased as the data portion J3 crosses the boundary 56, or the size of data portion H13 may be increased as the data portion H13 crosses the boundary 52, etc. Additionally, embodiments include boundaries that are non-linear, including arcs, curves, etc. In some embodiments, the edge boundaries may not be orthogonal to the expansion boundary. For example, the upper edge boundary may slope towards the lower edge boundary and the lower edge boundary may slope towards the upper edge boundary. As another example, the expansion boundary may run in a generally diagonal direction between the upper and lower edge boundaries. Furthermore, in some embodiments, the system may use a focus area, where the edge boundaries are two opposite sides, but not necessarily parallel sides, of the focus area and the expansion boundary is a third side of the focus area. In such an embodiment, a target level may be the level inside the focus area.

The following is an example of mathematical relationships that can be included in the spacing rules 14 and applied by the spatial module 129 shown in FIG. 1. Specially, in response to movement of the hierarchical dataset 510 along an arbitrary vector AB, the system may determine a target group or target stack based on the direction of the movement, e.g. the vector AB. The system may adjust the target group's expansion using the mathematical relationships below and then adjust surrounding groups, e.g., groups in a higher hierarchical level and groups in a lower hierarchical level, to accommodate the expansion or contraction of the target group (or groups).

To calculate the expansion or contraction of a target group, the system may first calculate a horizontal component $e_x$ and a vertical component $e_y$ for the group. To calculate the horizontal component $e_x$ the system may calculate a horizontal center $c_x$ for the representations in the target group. If the vector AB causes the horizontal center $c_x$ of the target group to move to the left of the expansion boundary the system may set $e_x$ to zero. Otherwise, the system may set the horizontal component based on the formula $e_x=(c_x-b_l)/(b_r-b_l)$ where $b_l$ represents the expansion boundary and $b_r$ represents a location on the display where the target group is fully expanded. In some embodiments this may be a location where the group is no longer a target group. In some embodiments, this location may be determined by or a function of the length of the representations. Thus, the horizontal component $e_x$ may range from zero to one.

The vertical component $e_y$ may also range from zero to one. The vertical component may be zero when the representation at the top of the target group ($r_t$) is below the lower edge boundary ($b_b$) the system may set $e_y$ to zero. Similarly, when the bottom of the target group ($r_b$) is above the upper edge boundary ($b_u$), the system may set the vertical component $e_y$ to zero. The system may also determine that when the bounds of the target group (e.g., between $r_t$ and $r_b$) includes the center of the display ($b_{\bar{y}}$), e.g., determined based on the center between the upper edge boundary and the lower edge boundary, the vertical component $e_y$ may be set to one. When the bottom of the target group $r_b$ is between the vertical center $b_{\bar{y}}$ and the upper edge boundary $b_u$, $e_y$ may be set to $(r_t-b_{\bar{y}})/(b_b-b_{\bar{y}})$ and when the top of the target group $r_t$ is between the vertical center $b_{\bar{y}}$ and the lower edge boundary $b_b$, $e_y$ may be set to $(r_b-b_u)/(b_{\bar{y}}-b_u)$. The system may multiply $e_x$ by $e_y$ to determine the expansion of the target group, where a value of one (1) represents full expansion within a focus area (e.g. an area bounded by $b_b$, $b_u$, $b_l$, and $b_r$). Distance between representations in a target group at full expansion may be determined by the quantity of members of the group. For example, a target group at full expansion with three members may have more distance between the representations than a target group with eight members. The system may use the position of the target group to position the remaining data portions on the display. For example, child groups may be centered on their parent and parents of the target stack may be centered with respect to the target stack. In some implementations, parents may be centered with respect to children still visible on the display if some children have moved off the display.

Figure 6:
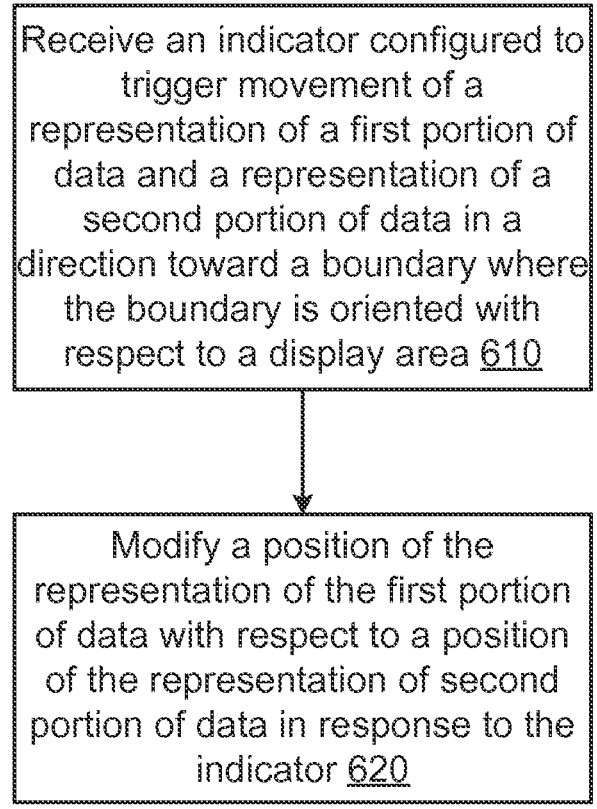
FIG. 6 is a flowchart that illustrates a method for handling representations of data.

FIG. 6 is a flowchart that illustrates a method for handling representations of data. In some embodiments, at least some portions of the method can be performed by, for example, the data placement module 120 shown in FIG. 1. In some embodiments, at least some portions of the method can be performed using a non-transitory computer-readable storage medium storing instructions that when executed cause a processor to perform the method.

As shown in FIG. 6, an indicator configured to trigger movement of a representation of a first portion of data and a representation of a second portion of data in a direction toward a boundary is received where the boundary is oriented with respect to a display area (block 610). In some embodiments, the indicator can be received at the input device module 124 shown in FIG. 1 and can be produced by the input device 105 shown in FIG. 1. In some embodiments, the first portion of data and the second portion of data can be included in the dataset 12 shown in FIG. 1. In some embodiments, the boundary can be defined within one or more of the spacing rules 14 shown in FIG. 1. In some embodiments, the first portion of data and the second portion of data can be associated with hierarchical data. In some embodiments, the boundary is aligned along an edge of a display area of a display. In some embodiments, the boundary can be disposed within or outside of the display area.

As shown in FIG. 6, a position of the representation of the first portion of data with respect to a position of the representation of second portion of data is modified in response to the indicator (block 620). In some embodiments, the position of the representation of the first portion of data and the position of the representation of the second portion of data is modified by the spatial module 129 shown in FIG. 1. In some embodiments, the position of the representation of the first portion of data and the position of the representation of the second portion of data is an increase in distance or a decrease in distance. In some embodiments, the position of the representation of the first portion of data and the position of the representation of the second portion of data is defined based on a mathematical relationship. In some embodiments, the boundary is a line and the position of the representation of the first portion of data is modified with respect to the position of the representation of second portion of data along a direction parallel to the line. In some embodiments, the representation of the first portion of data and the representation of the second portion of data are disposed on a first side of the boundary, and the representation of the first portion of data and the representation of the second portion of data have a hierarchical relationship with a third portion of data on a second side of the boundary.

Figure 7:
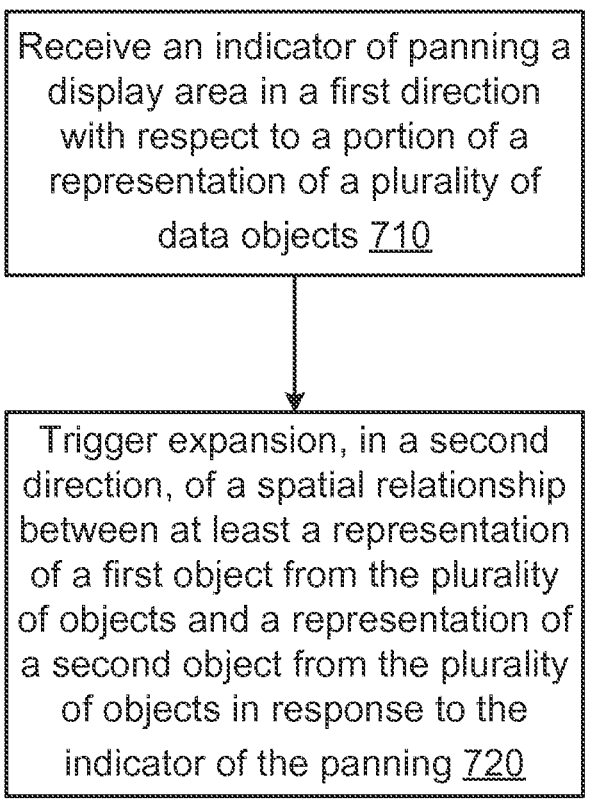
FIG. 7 is a flowchart that illustrates another method for handling representations of data.

FIG. 7 is a flowchart that illustrates another method for handling representations of data. In some embodiments, at least some portions of the method can be performed by, for example, the data placement module 120 shown in FIG. 1. In some embodiments, at least some portions of the method can be performed using a non-transitory computer-readable storage medium storing instructions that when executed cause a processor to perform the method.

As shown in FIG. 7, an indicator of panning a display area in a first direction with respect to a portion of a representation of a plurality of data objects is received (block 710). In some embodiments, the indicator of the panning or movement can be received at the input device module 124 are shown in FIG. 1, and can be produced at the input device 105 shown in FIG. 1.

As shown in FIG. 7, expansion, in a second direction, of a spatial relationship between at least a representation of a first object from the plurality of objects and a representation of a second object from the plurality of objects can be triggered in response to the indicator of the panning (block 720). In some embodiments, the expansion can be triggered by the spatial module 129 shown in FIG. 1. In some embodiments, the expansion has a magnitude defined based on a mathematical relationship including a magnitude of the panning. In some embodiments, the expansion can be non-linear with respect to a magnitude of the panning. In some embodiments, the indicator of the panning is a first indicator, and the process can include receiving a second indicator of panning the display area in a third direction opposite the first direction with respect to the portion of the representation of the plurality of data objects. The process can also include triggering contraction (by the spatial module 129 shown in FIG. 1), in a fourth direction opposite the second direction, of the spatial relationship between the at least the representation of the first object from the plurality of objects and the representation of the second object from the plurality of objects in response to the indicator of the panning.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory computer-readable storage medium storing instructions that when executed cause a processor to perform a process, the process comprising:

receiving an indicator configured to trigger movement of a first representation of a first data element in a dataset, the first representation including a first portion and a second representation of a second data element in the dataset, the second representation including a second portion in a direction toward a boundary, the boundary being oriented with respect to a display area; and modifying a position of the first representation with respect to a position of the second representation in response to the indicator, the positions being based on a distance, wherein a size of the first representation and a size of the second representation remain constant subsequent to modifying the positions and wherein:

when the first portion of the first representation and the second portion of the second representation intersect the boundary, the distance is a target distance, when the first portion of the first representation and the second portion of the second representation are disposed on a first side of the boundary, the distance is greater than the target distance, and when the first portion of the first representation and the second portion of the second representation are disposed on a second side of the boundary the distance is less than the target distance.

2. The process of claim 1, wherein the distance between the first representation and the second representation is defined based on a mathematical relationship.

3. The process of claim 1, wherein the boundary is a line, the position of the first representation is modified with respect to the position of the second representation along a direction parallel to the line.

4. The process of claim 1, wherein the distance between the first representation and the second representation increases as the movement moves the first portion of the first representation and the second portion of the second representation further from the boundary on the first side.

5. The process of claim 1, wherein the first representation and the second representation are disposed on the second side of the boundary, the first representation and the second representation have a hierarchical relationship with a third representation of a third data element in the dataset that is on the first side of the boundary.

6. The process of claim 1, wherein the distance between the first representation and the second representation decreases as the movement moves the first portion of the first representation and the second portion of the second representation further from the boundary on the second side.

7. The process of claim 1, wherein the first representation is disposed over the second representation before the indicator is received, a distance between the position of the first representation and the position of the second representation is increased in response to the indicator such that the first representation is separate from the second representation.

8. The process of claim 1, wherein the first data element and the second data element represent genealogical data.

9. The process of claim 1, wherein the boundary is a boundary of a region.

10. A non-transitory computer-readable storage medium storing instructions that when executed cause a processor to perform a process, the process comprising:

initiating display of representations of a portion of a plurality of data objects in a display area, the data objects representing individual elements in a dataset, at least a portion of a first representation of a first object of the plurality of data objects and at least a portion of a second representation of a second object of the plurality of data objects intersecting a boundary, wherein the first representation and the second representation have a spatial relationship that is a target distance based on intersection with the boundary;

receiving an indicator of panning the display area in a first direction with respect to the representations, the first direction moving the first representation and the second representation to a first side of the boundary; and triggering expansion, in a second direction, of the spatial relationship between the first representation and the second representation in response to the indicator of the panning, wherein the spatial relationship expands from the target distance based on a mathematical relationship with a magnitude of the panning, wherein a size of the first representation and a size of the second representation remain constant during the expansion.

11. The process of claim 10, wherein the representation of the plurality of data objects is a two-dimensional representation of a plurality of data objects.

12. The process of claim 10, wherein the expansion is non-linear with respect to the magnitude of the panning.

13. The process of claim 10, wherein the first direction is an expanding direction, wherein the spatial relationship between the first representation of the first object and the second representation of the second object always expands responsive to panning in the first direction and wherein a third direction opposite the first direction is a contracting direction, wherein the spatial relationship always contracts responsive to panning in the third direction.

14. The process of claim 10, wherein the first direction is non-parallel to the second direction.

15. The process of claim 10, wherein the first direction is orthogonal to the second direction.

16. The process of claim 10, wherein the panning includes a component in the first direction and a component in the second direction and the magnitude of the panning is based on the component in the first direction.

17. The process of claim 10, wherein the indicator of the panning is a first indicator, the process further comprising:

receiving a second indicator of panning the display area in a third direction opposite the first direction with respect to the portion of the representation of the plurality of data objects; and triggering contraction, in a fourth direction opposite the second direction, of the spatial relationship between the first representation of the first object and the second representation of the second object in response to the indicator of the panning, wherein when the first representation and the second representation are on a second side of the boundary the spatial relationship contracts to less than the target distance.

18. A method comprising:

initiating display of representations of a portion of a plurality of data objects, the display including a boundary running in a first direction, plurality of data objects being organized in a hierarchy, wherein representations for data objects in a same level are displayed aligned in the first direction and wherein a first representation of a first object of the plurality of data objects and a second representation of a second object of the plurality of data objects are spaced at a distance;

modifying, responsive to detecting an indication of movement in a second direction orthogonal to the first direction, a position of the first representation and the second representation by expanding the distance without changing a size of the first representation or a size of the second representation; and modifying, responsive to detecting an indication of movement in a third direction opposite the second direction, a position of the first representation and the second representation by contracting the distance without changing the size of the first representation or the size of the second representation, wherein when a portion of the first representation and a portion of the second representation intersect the boundary the distance is a target distance.

19. The method of claim 18, wherein the distance between the first representation and the second representation increases from the target distance as the movement moves the first representation further in the second direction.

20. The method of claim 18, wherein the movement in the second direction is part of a panning that includes a component in the first direction and a component in the second direction and the expansion is based on the component in the second direction but not the component in the first direction.

* * * * *